Jan. 26, 1965   D. W. G. BYATT   3,167,773
RADIO DIRECTION FINDING SYSTEMS
Filed March 13, 1963
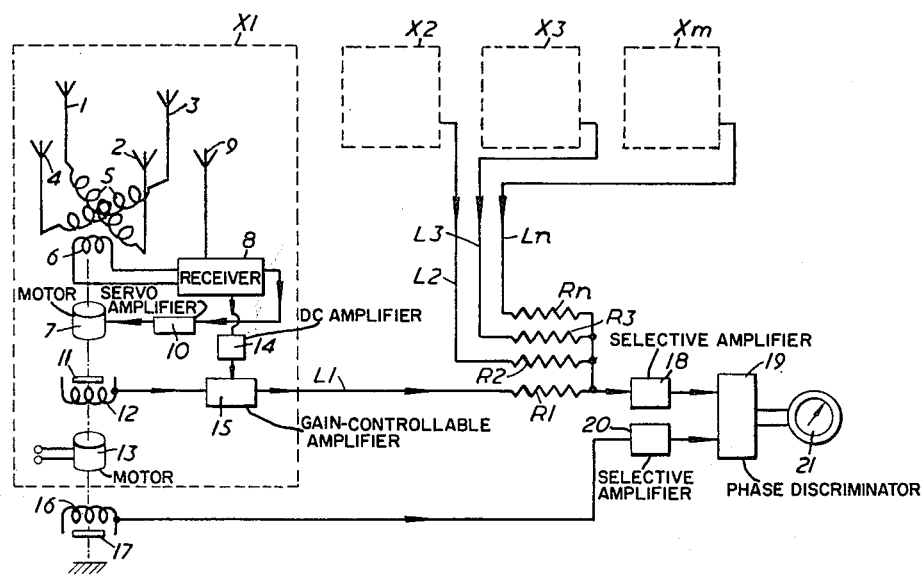
INVENTOR
Dennis William George Byatt
BY
Baldwin & Wight
ATTORNEYS

United States Patent Office 3,167,773
Patented Jan. 26, 1965

3,167,773
RADIO DIRECTION FINDING SYSTEMS
Dennis William George Byatt, Great Baddow, England, assignor to The Marconi Company Limited, London, England, a British company
Filed Mar. 13, 1963, Ser. No. 264,944
Claims priority, application Great Britain, Apr. 11, 1962, 14,048/62
6 Claims. (Cl. 343—117)

This invention relates to radio direction finding systems and has for its object to provide improved radio direction finding systems of low direction finding error.

As is well known, propagation effects, inherent in the nature of the ionosphere, are a common cause of bearing errors and apparent fluctuations in incoming radio signal directions in radio directing finding systems, such errors and fluctuations being most troublesome when irregularities and variations in the ionosphere cause wave interference. Various expedients have been adopted in order to reduce these errors. One of the best of these expedients consists in employing a receiving aerial system of large aperture and comprising a number of geographically spaced aerials, e.g. aerials of the Adcock type, and cyclically and in turn sampling the signals received on the different aerials with the object of averaging out and thus more or less eliminating errors due to propagation effects. Nevertheless, even the best of the known usual direction finding systems leaves much to be desired as regards reliable and consistent accuracy especially when wave interference due to propagation effects causes signal fading.

According to this invention in its broadest aspect, direction-representative signals derived from a plurality of spaced self-orienting direction finders are combined in strengths respectively dependent upon the strengths of the signals received at the different direction finders, and the combined resultant is employed for indicating the direction of a station being received.

According to a feature of this invention a radio direction finding system comprises a plurality of geographically spaced self-orienting direction finders, means for deriving, from each of said direction finders, a signal representative of the momentary incoming signal direction at said direction finder, means for controlling the strength of each derived signal in dependence upon the strength of the received signal at the direction finder from which said signal is derived, and means for combining the strength-controlled signals and utilising the combined resultant for indicating direction of a station being received.

In a preferred embodiment each direction finder includes a direction sensitive member of rotatable directivity, a receiver, means actuated by signals from said receiver for automatically orientating said direction sensitive member, means for producing an alternating current signal whose phase relative to a reference phase signal is representative of the momentary orientation, and means controlled by the signal strength received by said receiver for controlling the amplitude of said alternating current signal, the amplitude controlled alternating current signals derived from the different direction finders being combined to produce a resultant combined signal which is employed for indicating incoming signal direction.

The reference phase signals used for the different direction finders must, of course, be in phase with one another and it is therefore preferred to use a single reference phase signal source for all the direction finders.

Each direction finder may conveniently comprise two or more pairs of aerials and an associated radio-goniometer having a rotatable rotor rotated under the control of the signals from the receiver.

The alternating current signal whose phase, relative to the reference phase signal, is representative of momentary orientation, is preferably produced by a generator having one element motor-driven at a predetermined speed of rotation and the other rotary element rotated with rotation of orientation, and the reference phase signal is preferably produced by a second similar generator having one element motor-driven at the aforesaid speed of rotation and the other element fixed in a predetermined position.

The invention is illustrated in the accompanying drawing which diagrammatically represents one embodiment. The arrangement shown in the drawing includes a number of similar geographically spaced direction finders of the self-orienting type. In order to simplify the drawing and because all the direction finders are similar, only one is shown in detail, the apparatus (not shown) inside the broken line blocks X2, X3 . . . Xn being assumed to be similar to that shown inside the block X1.

Referring to the drawing there is any desired number of similar self-orienting direction finders—four are indicated in the drawing—which are geographically spaced so as together to constitute a wide aperture aerial installation. As already stated, only one is shown and will be described in detail. Within the broken line block X1 is a direction finding aerial system consisting of two mutually perpendicular pairs of aerials 1, 2, 3, 4 and an associated radio-goniometer consisting of a stator 5 with mutually perpendicular stator windings and a rotatable rotor or so-called search coil 6. The rotor is rotated by a motor 7 in manner known per se so as automatically to orientate itself to the incoming signal direction at the aerials 1, 2, 3, 4. As shown the output from the search coil 6 is fed to a receiver 8 which is also fed from a sense-determining open aerial 9 in the usual way and is fitted with automatic gain control (A.G.C.) not separately shown, of any convenient well known form, the demodulated output from the receiver 8 being fed to a servo amplifier and motor controlling unit 10 the output from which drives the motor 7 so as automatically to orient the rotor 6. The motor 7 also aligns the permanent magnet 11 of an A.C. generator comprising said magnet and a winding 12, the latter being rotated by an independently driven constant speed motor 13 driven at such speed as to produce an A.C. output of desired frequency—e.g. 25 c./s.—from the winding 12. The phase of the A.C. output from winding 12 will obviously depend upon the position in rotation of the magnet 11 and therefore upon the orientation of the goniometer rotor 6.

Voltage dependent upon the signal strength fed to the receiver 8, e.g. voltage from the A.G.C. line of the receiver, is amplified as necessary by a D.C. amplifier 14 and employed to control the gain of an amplifier 15 amplifying the output from the generator winding 12. This amplifier 15 may be of any convenient gain-controllable type, e.g. one comprising tubes of the variable-$\mu$ type. The gain-controlled output from amplifier 15 is fed over lead L1 to a resistance R1 of a combining network exemplified as consisting of a network of similar resistances R1, R2, R3 . . . Rn. Each of the other resistances in this network is fed over a different lead L2, L3 . . . Ln, corresponding to the line L1, from a different one of the other direction finders X1, X2 . . . Xn of which there may be any number.

A reference phase signal is generated by the winding 16 of a second A.C. generator similar to the generator 11–12. The winding 16 is driven at the same speed as the winding 12 by the motor 13 and the magnet 17 of this generator is fixed so that the output from the said generator 16–17 is of fixed phase. All the direction finders in the system are so adjusted that this fixed phase is utilisable for all of them and the generator 16–17 is accordingly common to them all. The combined A.C.

signal—at 25 c./s. in the example described—from the combining network R1, R2, R3 . . . R$n$, is fed to a selective amplifier 18 which extracts the average phase of the inputs thereto. The output of amplifier 18 is fed as one input to a phase discriminator 19 of known form, the other input to which is obtained from a similar selective amplifier 20 amplifying the reference phase signal from winding 16. The output from the discriminator is utilised in any well known way to actuate a direction indicating recorder and/or indicator 21, e.g. a cathode ray tube.

I claim:

1. A radio direction finding system comprising a plurality of spaced self-orienting direction finders providing direction representative signals; means for deriving control signals dependent upon the strengths of the signals received at the different direction finders; means, controlled by said control signals, for controlling the strengths of said direction representative signals so that the strengths of the direction representative signals depend upon the strengths of the signals received at the different direction finders; means for combining said direction-dependent signals; and means for utilising the combined resultant to indicate the direction of a station being received.

2. A radio direction finding system comprising a plurality of geographically spaced self-orienting direction finders, means for deriving, from each of said direction finders, a signal representative of the momentary incoming signal direction at said direction finder, means for controlling the strength of each derived signal in dependence upon the strength of the received signal at the direction finder from which said signal is derived, means for combining the strength-controlled signals, and means for utilising the combined resultant for indicating direction of a station being received.

3. A system as claimed in claim 2 wherein each direction finder includes a direction sensitive member of rotatable directivity, a receiver, means actuated by signals from said receiver for automatically orientating said direction sensitive member, means for producing a reference phase signal, means for producing an alternating current signal whose phase, relative to the reference phase signal, is representative of the momentary orientation, and means controlled by the signal strength received by said receiver for controlling the amplitude of said alternating current signal, and wherein there are provided means for combining the amplitude controlled alternating current signals received from the different direction finders to produce a resultant combined signal, and means for utilising said resultant combined signal for indicating signal direction.

4. A system as claimed in claim 3 wherein said means for producing a reference phase signal is a single reference phase signal source common to all the direction finders.

5. A system as claimed in claim 1 wherein each direction finder comprises a plurality of pairs of aerials and an associated radio-goniometer having a rotatable rotor rotated under the control of the signals from the receiver.

6. A system as claimed in claim 3 wherein the means for producing the alternating current signal whose phase, relative to the reference phase signal, is representative of momentary orientation comprises a generator having one element motor-driven at a predetermined speed of rotation and the other rotary element rotated with rotation of orientation, and the reference phase signal is produced by a second similar generator having one element motor-driven at the aforesaid speed of rotation and the other element fixed in a predetermined position.

References Cited by the Examiner

UNITED STATES PATENTS

| | | | |
|---|---|---|---|
| 2,903,576 | 9/59 | Altman | 325—305 |
| 3,047,862 | 7/62 | Jolliffe | 343—113 |

CHESTER L. JUSTUS, *Primary Examiner.*